US012689876B2

(12) United States Patent (10) Patent No.: US 12,689,876 B2
Puller et al. (45) Date of Patent: Jul. 21, 2026

(54) VEHICLE AND SERVER FOR QUALITY MEASUREMENT OF A ROAD SIDE UNIT

(71) Applicant: Volkswagen Aktiengesellschaft, Wolfsburg (DE)

(72) Inventors: Niklas Puller, Braunschweig (DE); Johannes Hartog, Calberlah (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 9 days.

(21) Appl. No.: 18/442,863

(22) Filed: Feb. 15, 2024

(65) Prior Publication Data

US 2024/0284152 A1 Aug. 22, 2024

(30) Foreign Application Priority Data

Feb. 21, 2023 (EP) ..................................... 23157860

(51) Int. Cl.
*H04W 4/44* (2018.01)
(52) U.S. Cl.
CPC ..................................... *H04W 4/44* (2018.02)
(58) Field of Classification Search
CPC ..................................................... H04W 4/44
See application file for complete search history.

(56) References Cited

U.S. PATENT DOCUMENTS

| | | | |
|---|---|---|---|
| 11,405,786 B1 * | 8/2022 | Monteuuis .......... | H04W 12/122 |
| 11,828,861 B1 * | 11/2023 | Lattin ..................... | G01S 19/40 |

| | | | |
|---|---|---|---|
| 2013/0083679 A1 * | 4/2013 | Krishnaswamy ...... | G08G 1/093 |
| | | | 370/252 |
| 2013/0093618 A1 * | 4/2013 | Oh .......................... | G01S 19/45 |
| | | | 342/357.44 |
| 2017/0131406 A1 | 5/2017 | Li et al. ........................ | 701/470 |
| 2017/0190331 A1 * | 7/2017 | Gupta ................... | B60W 10/20 |
| 2018/0310242 A1 * | 10/2018 | Konishi ................ | G08G 1/164 |
| 2019/0232972 A1 * | 8/2019 | Lin ......................... | G01C 25/00 |

(Continued)

FOREIGN PATENT DOCUMENTS

| | | | | | |
|---|---|---|---|---|---|
| AU | 2022213131 A1 * | 7/2023 | ............. | G05D 1/249 |
| CN | 111121849 A * | 5/2020 | ........... | G01D 18/002 |

(Continued)

OTHER PUBLICATIONS

Extended European Search Report, Application No. 23157860.0, 10 pages.

*Primary Examiner* — James R Sheleheda
(74) *Attorney, Agent, or Firm* — Slayden Grubert Beard PLLC

(57) ABSTRACT

The disclosure refers to a vehicle and a sensor, which are configured for a quality measurement of a road side unit. The vehicle comprises at least one sensor, a communication interface, and a controller. The controller is configured for receiving a first message from the RSU via the communication interface, the first message being based on a second sensor value obtained by a sensor of the RSU and corresponding to a first sensor value detected by the sensor of the vehicle. The controller is further configured for determining a deviation based on the first sensor value and the second sensor value and transmitting a second message to the server via the communication interface, the second message comprising the deviation.

16 Claims, 3 Drawing Sheets

(56) References Cited

U.S. PATENT DOCUMENTS

| | | | | |
|---|---|---|---|---|
| 2020/0120444 A1* | 4/2020 | Banach | .................... | G01S 19/42 |
| 2021/0063546 A1* | 3/2021 | Slobodyanyuk | ........ | G01S 13/91 |
| 2021/0118304 A1 | 4/2021 | Teuss et al. | | |
| 2021/0289329 A1* | 9/2021 | Mielenz | ................ | H04L 67/125 |
| 2021/0311183 A1* | 10/2021 | Marsh | .................... | G01S 17/931 |
| 2022/0103986 A1 | 3/2022 | Hwang et al. | | |
| 2022/0107382 A1* | 4/2022 | Hwang | ................. | G01S 5/0284 |
| 2022/0179423 A1* | 6/2022 | Kakuta | .............. | G05D 1/0077 |
| 2022/0182855 A1* | 6/2022 | Yehliu | ................... | H04W 24/08 |
| 2022/0230537 A1* | 7/2022 | Whyte | .................... | H04W 4/40 |
| 2022/0256333 A1* | 8/2022 | Whyte | ................ | H04W 12/121 |
| 2022/0264270 A1 | 8/2022 | Monteuuis et al. | | |
| 2022/0301428 A1 | 9/2022 | Balasubramanian et al. | | |
| 2022/0317312 A1 | 10/2022 | Sharma et al. | | |
| 2022/0324488 A1* | 10/2022 | Yuki | ......................... | G08G 1/16 |
| 2022/0338012 A1* | 10/2022 | Monteuuis | .............. | H04L 67/12 |
| 2023/0128212 A1* | 4/2023 | Azuma | ................. | H04W 4/023 |
| | | | | 701/25 |
| 2023/0131434 A1* | 4/2023 | Bandi | ................... | G01S 17/931 |
| | | | | 340/935 |
| 2023/0131659 A1* | 4/2023 | Banach | ........... | G08G 1/096783 |
| | | | | 701/1 |
| 2023/0152471 A1* | 5/2023 | Nekoui | ................. | G01S 19/396 |
| | | | | 342/357.64 |
| 2023/0154248 A1* | 5/2023 | Das | ......................... | H04W 4/38 |
| | | | | 701/31.4 |
| 2023/0176212 A1* | 6/2023 | Kim | ......................... | G01S 17/04 |
| | | | | 455/456.1 |
| 2023/0300616 A1* | 9/2023 | Petit | ...................... | H04W 12/66 |
| | | | | 726/22 |
| 2023/0331251 A1* | 10/2023 | Mizuno | .................. | G05D 1/247 |
| 2024/0089736 A1* | 3/2024 | Monteuuis | .......... | H04L 63/1416 |
| 2024/0259989 A1* | 8/2024 | Li | .......................... | G01S 5/0244 |
| 2024/0284152 A1* | 8/2024 | Puller | ..................... | H04W 4/40 |
| 2024/0321096 A1* | 9/2024 | Abbaspour | ....... | B60W 60/0053 |
| 2024/0420517 A1* | 12/2024 | Köstermann | ........... | H04L 63/00 |
| 2025/0065905 A1* | 2/2025 | Abbaspour | ......... | B60W 60/001 |

FOREIGN PATENT DOCUMENTS

| | | | | |
|---|---|---|---|---|
| CN | 111881244 A | | 11/2020 | ............. G06F 16/29 |
| CN | 113625323 A | | 11/2021 | ............. G01C 21/16 |
| DE | 102016217081 A1 * | | 3/2018 | ............. H04L 67/12 |
| EP | 3310079 A1 * | | 4/2018 | ............. H04L 67/12 |
| EP | 4421774 A1 * | | 8/2024 | ............. G01D 21/02 |
| KR | 102085917 B1 * | | 3/2020 | ............. B60W 40/02 |
| KR | 20210103607 A * | | 8/2021 | ............. H04L 63/08 |
| WO | WO-2020075677 A1 * | | 4/2020 | ............. H04W 72/56 |
| WO | WO-2022098147 A1 * | | 5/2022 | ............. H04W 4/44 |
| WO | WO-2024175215 A1 * | | 8/2024 | ............. H04W 4/38 |

* cited by examiner

VEHICLE AND SERVER FOR QUALITY MEASUREMENT OF A ROAD SIDE UNIT

CROSS-REFERENCE TO RELATED APPLICATIONS

This application claims priority to European Patent Application No. 23157860.0, filed on Feb. 21, 2023 with the European Patent Office. The contents of the aforesaid patent application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure refers to a vehicle, particularly a vehicle for quality measurement of a road side unit, the vehicle comprising at least one sensor, a communication interface and a controller. Further, the disclosure relates to a server, particularly a server for quality measurement of a road side unit, wherein the server is configured for wireless communication with the vehicle.

Car2X Road Side Units (RSUs) use sensor technology to record the traffic situation and transmit the determined data to surrounding traffic participants. Calibration errors can occur during the installation or operation of RSUs, for example due to a shift or inclination of the sensor used relative to the set position. This can result in the transmitted object data no longer accurately reflecting reality, but instead in a difference between a transmitted object and its real-world counterpart.

In order to detect these errors, the RSUs operated must be regularly checked for correct calibration. For this purpose, drives with a reference vehicle at the RSU can be undertaken. This procedure, in which the RSUs in operation are checked regularly, is time-consuming and requires the presence of a reference vehicle with a driver and, if necessary, a technician on site.

Furthermore, the quality of RSU data can vary depending on the sensors and algorithm used. Manufacturer A, for example, may provide better data quality than manufacturer B, even if the sensor is set correctly. In addition, statements about the sensors used may also be more or less accurate to reality (e.g., information about sensor range, update frequency, etc.).

Without a certification process of the sending RSU, the receiving vehicle can thus only insufficiently assess how well the data of an RSU can be trusted.

SUMMARY

A need exists to provide a vehicle and/or a server for improved quality measurement of a road side unit.

The need is addressed by the subject matter of the independent claim(s). Embodiments of the invention are described in the dependent claims, the following description, and the drawings.

DESCRIPTION

Figure 1:
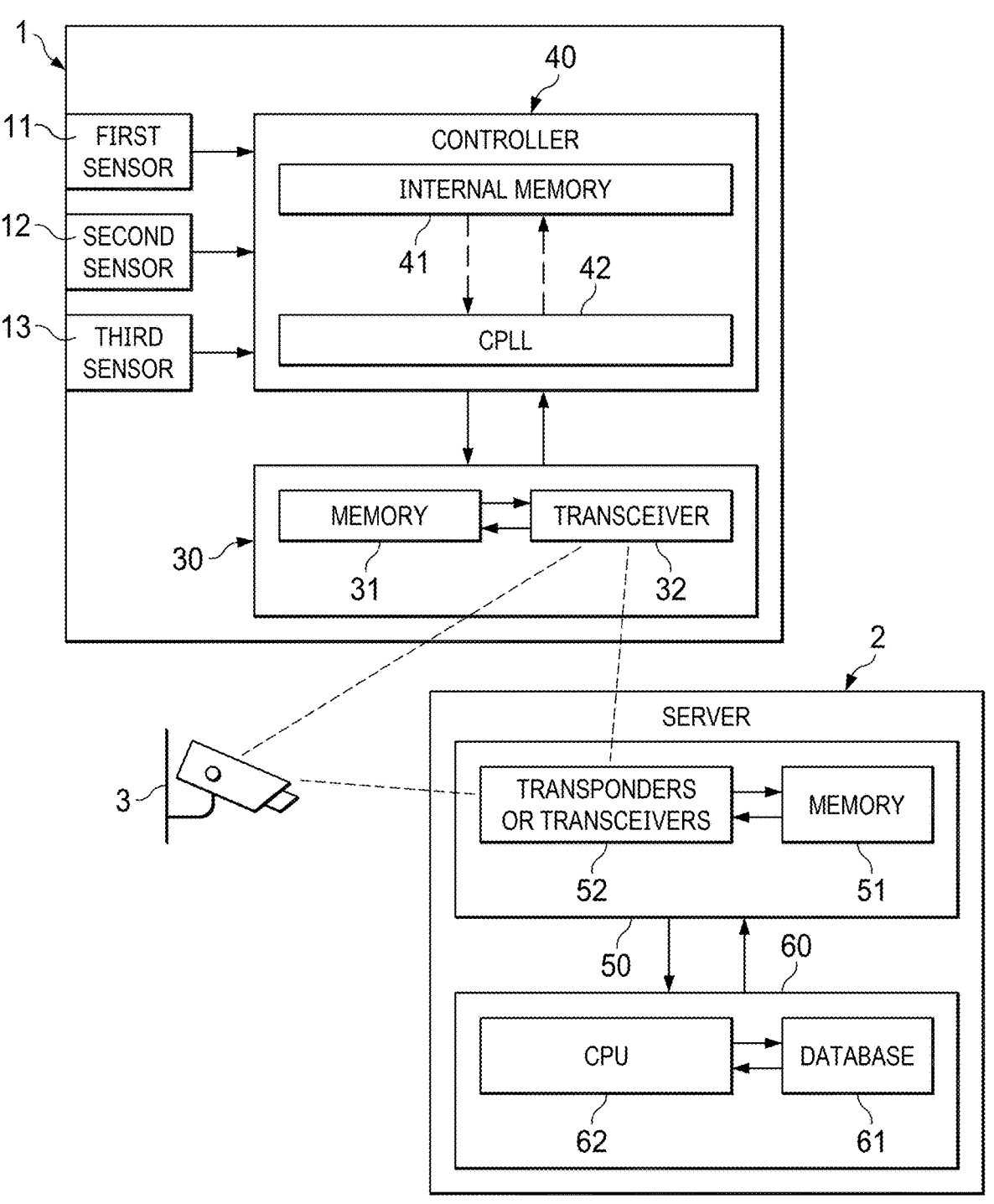
FIG. 1 illustrates a vehicle, a server and an RSU according to some embodiments of the present disclosure.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A first example aspect of the present disclosure relates to a vehicle, for example an automated passenger car with internal combustion engine, electric motor or hybrid engine, comprising at least one sensor configured for detecting sensor values, a communication interface (also referred to herein as ' communication module' or 'communication interface circuitry'), configured for wireless communication with an RSU and a server, and a controller of the vehicle.

The at least one sensor is for example configured to detect sensor signals relating to the environment of the vehicle. For example, the at least one sensor is a radar, lidar, sonar, GPS, odometry, inertial and/or camera sensor.

The communication interface is in some embodiments configured to receive and send information directly or indirectly via vehicle-to-vehicle, V2V, communication, vehicle to everything, V2X, communication or via vehicle to infrastructure, V2I, communication. In some embodiments, the communication interface is configured for direct communication according to the ITS-G5 and/or the C-V2X standard and/or for indirect communication via a backend.

The controller (also referred to as a 'control circuit' or 'processor') is configured for receiving a first message from the RSU via the communication interface. For example, the first message is a collective perception message, CPM, according to the ETSI TR 103 562 or ETSI TS 103 324 standard. The first message is based on a first sensor value obtained by a sensor of the RSU.

The controller may further be configured for detecting a second sensor value via the at least one sensor. The second sensor value corresponds to the first sensor value.

The controller may further be configured for transmitting a second message to the server via the communication interface. The second message is based on the first sensor value and the second sensor value. For example, the second message comprises the first sensor value and the second sensor value. In some embodiments, the second message is transmitted via a different form of communication than the first message.

A vehicle according to some embodiments may be configured in such a way that it is capable of determining and transmitting corresponding sensor values to designated sensor values in order to enable verification of the designated sensor values.

In some embodiments, the controller is further configured for determining a deviation based on the first sensor value and the second sensor value. For example, the controller is configured to detect an offset between the first and second sensor values and/or to detect an overestimation or underestimation of confidence values based on the first and second sensor values. For example, the detection of the offset and/or overestimation or underestimation is based on a plurality of first and second sensor values. In some embodiments, the controller is configured to determine the deviation based on the detected offset and/or the detected overestimation or underestimation. In some embodiments, the first message comprises the first sensor value and the controller is configured for determining the deviation as the difference between the first sensor value and the second sensor value. The deviation is thus calculated in a particularly convenient way. In some embodiments, the second message comprises the deviation. The vehicle can thus beneficially check questionable sensor values of the RSU by itself and a computational effort for determining the deviation is provided by the vehicle. In some embodiments, when the second message comprises the deviation, the first sensor value and/or the second sensor value is not transmitted via the second message, thus resources are saved.

In some embodiments, the first message comprises a first derivative value based on the first sensor value. For example, the first derivative value is a position of the vehicle calculated from at least one first sensor value determined by at least one distance sensor of the RSU. The controller is in some embodiments further configured for determining a second derivative value based on the second sensor value. For example, the first derivative value and the first sensor value are related in the same way as the second derivative value and the second sensor value. In some embodiments, the first derivative value and the first sensor value are related in a different way than the second derivative value and the second sensor value. For example, the second derivative value is a position calculated from a second sensor value obtained from a GPS sensor. In some embodiments, the controller is configured for determining the deviation as the difference between the first derivative value and the second derivative value. In some embodiments, the first and/or second message comprises information on the derivative values, e.g., the method of determination of the values. In some embodiments, the second message may comprise the first derivative value and the second derivative value. Those embodiments beneficially lead to a larger number of different sensor types of the RSU being able to be checked by the vehicle. It is also particularly beneficial that sensors of the RSU can be checked whose type is not installed in the vehicle.

In some embodiments, the first message comprises sensor-based information related to a plurality of vehicles. This sensor-based information can comprise first sensor values and/or first derivative values derived based on first sensor values. For example, the first message comprises a current traffic scenario, i.e., information on all vehicles that are situated in the area surrounding the RSU. The controller is in some embodiments further configured for retrieving information related to the vehicle from the first message and determining the deviation based on the information related to the vehicle and the second sensor value. In those embodiments, the vehicle is beneficially configured to pick out the relevant information for a check of the RSU from a multitude of information on its own. For example, the information can also be obtained from messages that were not created and sent for the purpose of verification, such as CPMs that are regularly exchanged between different participants of a system for autonomous driving.

In some embodiments, the controller is further configured for determining an ID of the RSU based on the first message. Throughout the present disclosure the ID is in some embodiments an information that clearly and unambiguously identifies the RSU. In some embodiments, the ID is a number, a name and/or a geographical position. The controller of the vehicle according to some embodiments is further configured for transmitting the second message to the server, the second message comprising the deviation and the ID of the RSU. This is a beneficial way of informing the server of the identity of the RSU to be checked.

In some embodiments, the controller is further configured for receiving a third message from the server via the communication interface. The third message for example comprises the ID of the RSU. In some embodiments, the third message comprises a mean deviation and/or score associated with the RSU. Beneficially, the vehicle is thus provided with information on the RSU, wherein such information may be determined based on swarm data.

For example, the score relates to an estimation of the reliability of the RSU. Based on the mean deviation or the score, the vehicle can thus assess whether information from the RSU can be trusted.

In some embodiments, the controller is further configured for performing a correction of further sensor values and/or further derivative values received from the RSU based on the mean deviation. Thus, the vehicle can beneficially process data received from the RSU even if it is known to be erroneous, especially by correcting the error itself.

In some embodiments, the controller is further configured for evaluating further first messages only if the score exceeds a predefined threshold. The controller is for example configured for evaluating all further messages send by the RSU only if the score exceeds a predefined threshold. In this way, messages from an RSU that is known to be particularly faulty are beneficially not processed, which leads to a higher level of vehicle safety.

Another example aspect of the present disclosure is a server, for example a server for measuring a quality of an RSU. The server may be operated by an Original Equipment Manufacturer, OEM, and/or a public authority.

The server comprises a communication interface (also referred to as a 'communication unit' or 'communication interface circuitry') configured for wireless communication with an RSU and a vehicle. The communication interface is for example configured to receive and send information directly or indirectly. In some embodiments, the communication interface is configured for direct communication according to the ITS-G5 and/or the C-V2X standard and/or for indirect communication via another server. The server further comprises a database configured for storing a variety of data.

Further, the server comprises a control circuit (also referred to as a 'control unit' or processing circuit'). The control circuit is configured for receiving messages from a plurality of vehicles via the communication interface. The messages are for example second messages send by the vehicle as described above. Each of the messages is based on a first sensor value detected by a sensor of the RSU. The first sensor value is for example received by the respective vehicle from the RSU and obtained by a sensor of the RSU. The respective vehicle is for example one vehicle of the plurality of vehicles transmitting a respective second message of such kind. Each of the received messages is further based on a corresponding second sensor value detected by a sensor of the respective vehicle.

The first sensor value is for example detected by the same kind of sensor as the second sensor value. Alternatively and in some embodiments, the first sensor value is detected by a different kind of sensor as the second sensor value. In some embodiments, the first sensor value and/or the second sensor value are obtained by a radar, lidar, sonar, GPS, odometry, inertial and/or camera sensor.

The server in some embodiments is beneficially designed in such a way that it is capable of receiving messages related to corresponding sensor values of vehicles and an RSU which can be used to evaluate the quality of the RSU. The messages received may also be used to assess the quality of the vehicles.

In some embodiments of the server, the control circuit is further configured for determining deviations based on the messages. For example, each of the messages is comprising a deviation and the control circuit is configured for determining the deviations by retrieving them from the messages.

In some embodiments, the control circuit is configured for determining first sensor values and second sensor values based on the messages and determining the deviations based on the first sensor values and the second sensor values. In some embodiments, the control circuit is configured for determining first sensor values and second sensor values based on derivative values retrieved from the messages and determining the deviations based on the first sensor values and the second sensor values. For example, the control circuit is configured to detect an offset between the first and second sensor values and/or to detect an overestimation or underestimation of confidence values based on the first and second sensor values. For example, the detection of the offset and/or overestimation or underestimation is based on a plurality of first and second sensor values. In some embodiments, the control circuit is configured to determine the deviations based on the detected offset and/or the detected overestimation or underestimation. In some embodiments, the control circuit is configured for determining the deviations as differences between the first sensor values and the corresponding second sensor values. The deviations are thus calculated in a particularly convenient way.

For example, the control circuit is further configured for aggregating the deviations as deviation data in the database. For example, the RSU associated with the respective deviation is identified by an ID in the deviation data.

The control circuit may be further configured for determining a mean deviation and/or score associated with the RSU based on the deviation data. For example, the score relates to an estimation of the reliability of the RSU. In some embodiments, the score is calculated as a first fixed value when the mean deviation exceeds a first predefined threshold and as a second fixed value when the mean deviation exceeds a second predefined threshold. The first predefined threshold and the second predefined threshold are for example determined based on mean values of the first and second sensor values. The mean deviation is for example determined as a mean value and/or a median of the deviations.

In some embodiments, the control circuit is further configured for transmitting a message to at least one of the plurality of vehicles and/or the RSU via the communication interface. The message is for example based on the deviation data. The message for example corresponds to the third message received by the vehicle as described above. The message may comprises the ID of the RSU. In some embodiments, the third message comprises the mean deviation and/or score associated with the RSU.

The server can thus inform the number of vehicles and/or the RSU about the quality of the RSU by means of the message. The vehicle may then beneficially respond to the quality data as described above. The RSU may perform a recalibration, offset correction or the like based on the mean deviation and/or score.

In some embodiments, the control circuit is further configured for triggering a maintenance of the RSU based on the deviation data. For example, the control circuit is configured for comparing the mean deviation with a predefined first threshold. The control circuit may be further configured for triggering a maintenance of the RSU if the mean deviation exceeds the predetermined first threshold. For example, the control circuit is further configured for comparing the score with a predefined second threshold. The control circuit may be further configured for triggering a maintenance of the RSU if the score falls below the predetermined second threshold.

The server can thus ensure that particularly faulty RSUs are removed from service and repaired. This has the benefit of increasing the safety of the autonomous driving system.

Another example aspect of the present disclosure relates to a method of a vehicle, for example of a vehicle as described above. The method comprises receiving a first message from an RSU. The first message is for example received directly or indirectly via vehicle-to-vehicle, V2V, communication, vehicle to everything, V2X, communication or via vehicle to infrastructure, V2I, communication. For example, the first message is received via direct communication according to the ITS-G5 and/or the C-V2X standard and/or via indirect communication via a backend. In some embodiments, the first message is a collective perception message, CPM, according to the ETSI TR 103 562 or ETSI TS 103 324 standard. The first message is based on a first sensor value obtained by a sensor of the RSU.

The method may further comprise detecting a second sensor value. The second sensor value corresponds to the first sensor value. The second sensor value is for example a sensor value relating to the environment of the vehicle. For example, the second sensor value is the sensor value of a radar, lidar, sonar, GPS, odometry, inertial and/or camera sensor.

The method may further comprise the step of transmitting a second message to a server. The second message is based on the first sensor value and the second sensor value. For example, the second message is transmitted via a different form of communication than the first message.

Various embodiments of the method of a vehicle according to the present disclosure correspond to embodiments of the vehicle according to the disclosure as described above. Benefits of the method of a vehicle correspond to benefits of the vehicle as described above.

A further example aspect of the present disclosure relates to a method of a server, for example of a server as described above. The method comprises receiving messages from a plurality of vehicles. The messages are for example second messages send by the vehicle as described above. The messages may be received directly or indirectly. For example, the messages are received via direct communication according to the ITS-G5 and/or the C-V2X standard and/or via indirect communication via another server.

Each of the messages is based on a first sensor value detected by a sensor of the RSU. The first sensor value is for example received by the respective vehicle from the RSU and obtained by a sensor of the RSU. The respective vehicle is for example one vehicle of the plurality of vehicles transmitting a respective second message of such kind. Each of the messages is further based on a corresponding second sensor value detected by a sensor of the respective vehicle.

The first sensor value may be detected by the same kind of sensor as the second sensor value. Alternatively and in some embodiments, the first sensor value is detected by a different kind of sensor as the second sensor value. For example, the first sensor value and/or the second sensor value are obtained by a radar, lidar, sonar, GPS, odometry, inertial and/or camera sensor.

Various embodiments of the method of a server according to the present disclosure correspond to embodiments of the server according to the disclosure as described above. Benefits of the method of a server correspond to benefits of the server as described above.

In some embodiments, the vehicle and the server, as well as the methods for a vehicle and a server according to the present disclosure, are also applicable to a quality measurement of another participant in a system for autonomous driving, just as they are for a quality measurement of an RSU. Such a participant is for example an intelligent traffic device or another vehicle.

Another example aspect of the disclosure relates to a computer program comprising instructions that, when the program is executed by a computer, such as a controller of a vehicle, cause the computer to execute the method of a vehicle as described above.

Another example aspect of the disclosure relates to a computer program comprising instructions that, when the program is executed by a computer, such as a control unit of a server, cause the computer to execute the method of a server as described above.

The different embodiments of the invention described herein may be combined unless the contrary is indicated herein.

Reference is now made to the following FIGS., in order to describe various embodiments of the invention in more detail.

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

As utilized herein, the term "example" means serving as a non-limiting example, instance, or illustration. As utilized herein, the terms "for example" and "e.g." introduce a list of one or more non-limiting examples, instances, or illustrations.

As used herein, the term "and/or" includes any and all combinations of one or more of the associated listed items. Further, the use of "may" when describing embodiments of the present invention refers to "one or more embodiments of the present invention." Further, in the following description of embodiments, the terms of a singular form may include plural forms unless the presented context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present invention. As used herein, the term "and/or" includes any and all combinations of one or more of the associated listed items and expressions such as "at least one of" when preceding a list of elements, modify the entire list of elements.

Reference will now be made in detail to embodiments which are illustrated in the drawings. Effects and features of the example embodiments will be described with reference to the accompanying drawings. Therein, like reference numerals denote like elements, and redundant descriptions are omitted. The present invention, however, may be embodied in various different forms, and should not be construed as being limited to only the illustrated embodiments herein. Rather, these embodiments are provided solely as examples for fully conveying the aspects and features of the present invention to those skilled in the art.

In the context of this discussion, the terms 'control circuit' and 'controller' are understood broadly to comprise hardware and hardware/software combinations to provide the respectively discussed functionality. The respective 'control circuit' and 'controller' may be formed integrally with further components. For instance, the functionality of the 'control circuit' and 'controller' may be provided by a microprocessor, microcontroller, FPGA, or the like, with corresponding programming. The programming may be provided as software or firmware, stored in a memory, or may be provided at least in part by dedicated ('hard-wired') circuitry.

FIG. 1 illustrates a vehicle 1, in particular a passenger vehicle with an internal combustion engine, an electric engine, or a hybrid engine, a server 2 and an RSU 3 according to some embodiments of the present disclosure.

The vehicle 1 comprises a plurality of sensors, in particular a first sensor 11, a second sensor 12, and a third sensor 13. The sensors 11, 12, 13 are arranged for detecting ambient data of the vehicle 1 and comprise, for example, a camera for detecting an image of a traffic scenario located in front of the vehicle 1, distance sensors, such as ultrasonic sensors, for detecting distances to objects or further vehicles surrounding the vehicle 1. The sensors 11, 12, 13 transmit the ambient data they detect to a controller 40 of the vehicle 1.

The controller 40 according to the present disclosure is configured to carry out the method of a vehicle according to the present disclosure, as explained in detail below. For this purpose, the controller 40 has an internal memory 41 and a CPU 42, which communicate with one another, for example via a suitable data bus. Furthermore, the controller 40 is in communication connection with at least the sensors 11, 12, 13 and a communication interface 30, for example via one or more respective CAN connections, one or more respective SPI connections or other suitable data connections.

The communication interface 30 comprises a memory 31 and one or more transponders or transceivers 32. The transceiver 32 is a radio, WLAN, GPS or Bluetooth transceiver or the like, in particular a transceiver configured for communication in a communication network. The transceiver 32 communicates with the internal memory 31 of the communication interface 30, for example via a suitable data bus. The communication interface 30 also communicates with the controller 40, in particular transmitting data received therefrom and/or receiving data to be sent therefrom. Furthermore, the communication interface 30 is adapted to communicate with a communication interface 50 of a server 2 via V2I communication, for example via a communication network. Furthermore, the communication interface 30 may also be arranged to communicate with one or more RSUs 3.

The communication network is for example a network according to 3GPP standard, for example an LTE, LTE-A (4G) or 5G communication network. The communication network may further be configured for the following operations or according to the following standards: High Speed Packet Access (HSPA), a Universal Mobile Telecommunication System (UMTS), UMTS Terrestrial Radio Access Network (UTRAN), evolved-UTRAN (e-UTRAN), Global System for Mobile communication (GSM), Enhanced Data rates for GSM Evolution (EDGE), GSM/EDGE Radio Access Network (GERAN). Alternatively or additionally, the communication network can also be designed according to one of the following standards: Worldwide Inter-operability for Microwave Access (WIMAX) network IEEE 802.16, Wireless Local Area Network (WLAN) IEEE 802.11. For example, the communication network uses one of the following coding schemes: Orthogonal Frequency Division Multiple Access (OFDMA), Time Division Multiple Access (TDMA), Code Division Multiple Access (CDMA), a Wideband CDMA (WCDMA), Frequency Division Multiple Access (FDMA), or Spatial Division Multiple Access (SDMA), etc.

The communication interface 50 of the server 2 comprises a memory 51 and one or more transponders or transceivers 52. The transceiver 52 is a radio, WLAN, GPS or Bluetooth transceiver or the like, in particular a transceiver configured for communication in a communication network. The transceiver 52 communicates with the internal memory 51 of the communication interface 50, for example via a suitable data bus. The communication interface 50 also communicates with a control circuit 60 of the server 2, for example via one or more respective CAN connections, one or more respective SPI connections or other suitable data connections, in particular transmitting data received therefrom and/or receiving data to be sent therefrom.

The control circuit 60 according to the present disclosure is configured to carry out the method of a server according to the present disclosure, as explained in detail below. For this purpose, the control circuit 60 has a database 61 and a CPU 62, which communicate with one another, for example via a suitable data bus.

Figure 2:
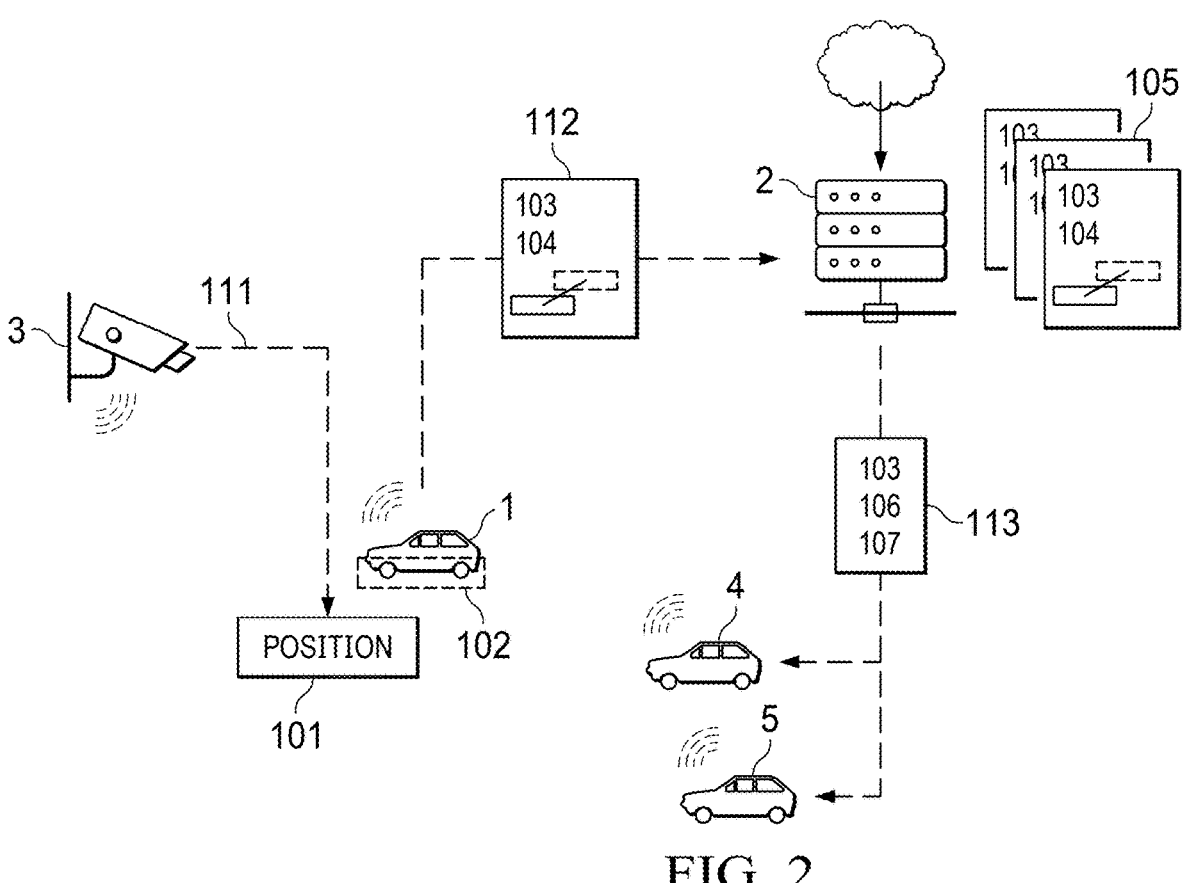
FIG. 2 illustrates an exemplary use case of the vehicle and the server according to some embodiments of the present disclosure.

FIG. 2 illustrates an exemplary use case of the vehicle and the server according to embodiments of the present disclosure. The RSU 3 is detecting a first sensor value 101, in particular a position 101 of the vehicle 1. The RSU 3 is further sending a first message 111 to the vehicle 1. The first message 111 is based on the first sensor value 101 and the ID 103 of the RSU. The vehicle 1 is also detecting its position as a second sensor value 102 and determining a deviation 104 based on the first and second sensor values 101, 102. The vehicle 1 is further sending a second message 112 to the server 2. The second message 112 comprises the ID 103 and the deviation 104. The server 2 is aggregating all received deviations 104 and IDs 103 as deviation data 105 in the database 61. Based on the deviation data 105, the server 2 is determining a score 107 and a mean deviation 106 associated with the RSU 3 with the ID 103. The server is then sending a third message 113 to two other vehicles 4, 5. The third message 113 comprises the ID n, the score 107 and the mean deviation 106.

Figure 3:
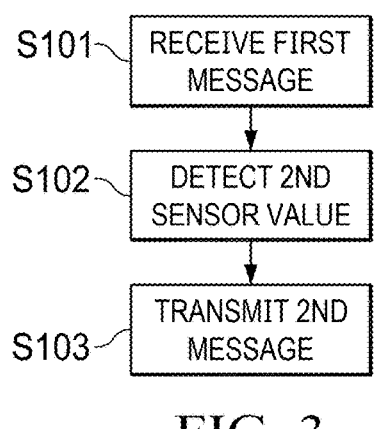
FIG. 3 illustrates a method of a vehicle according to an embodiment of the present disclosure.

FIG. 3 illustrates a method of a vehicle 1 according to an example embodiment of the present disclosure. The method comprises as a first step S101 a receiving of a first message 111 from an RSU 3. The first message 111 is based on a first sensor value 101 obtained by a sensor of the RSU 3.

The method further comprises the second step S102 of detecting a second sensor value 102. The second sensor value 102 corresponds to the first sensor value 101 received in the first step S101. The second sensor value 102 is for example a sensor value of a radar, lidar, sonar, GPS, odometry, inertial and/or camera sensor.

The method further comprises the third step S103 of transmitting a second message 112 to a server 2. The second message 112 is based on the first sensor value 101 and the second sensor value 102 detected in the second step S102.

Figure 4:
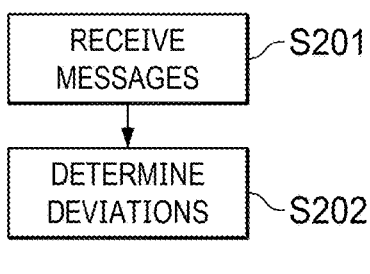
FIG. 4 illustrates a method of a server according to an embodiment of the present disclosure.

FIG. 4 illustrates a method of a server 2 according to an embodiment of the present disclosure. The server 2 is particularly a server 2 as described above. The method comprises the step S201 of receiving messages from a plurality of vehicles. The messages are particularly second messages 112 send by the vehicle as described above.

Each of the messages is based on a first sensor value 101 detected by a sensor of the RSU 3. Each of the messages is further based on a corresponding second sensor value 102 detected by a sensor 11, 12, 13 of the respective vehicle 1. The respective vehicle 1 is the one vehicle 1 of the plurality of vehicles transmitting the respective message.

The method according to an embodiment further comprises as a step S202 a determining of deviations 104 based on the second messages 112. In particular, the server 2 is determining first sensor values 101 and second sensor values 102 based on the second messages 112 and determining the deviations 104 based on the first sensor values 101 and the second sensor values 102.

Figure 5:
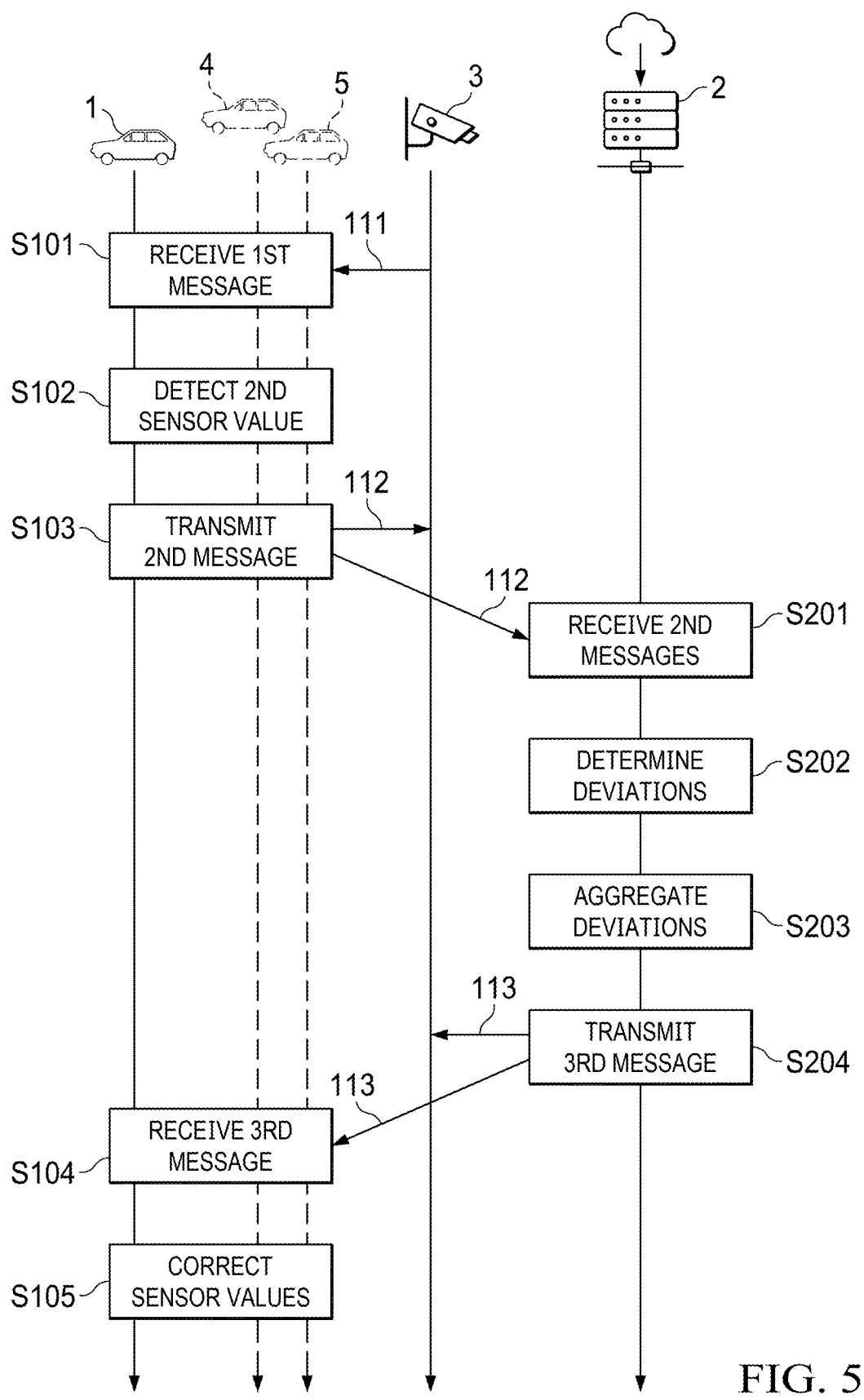
FIG. 5 illustrates another exemplary use case of the method of a vehicle and the method of a server according to embodiments of the present disclosure.

FIG. 5 illustrates another exemplary use case of the method of a vehicle 1 and the method of a server 2 according to some embodiments of the present disclosure. The methods are performed by a system for quality measurement of an RSU 3 comprising the vehicle 1, the other vehicles 4, 5, the RSU 3 and the server 2.

In the first step S101 the first message 111 from the RSU 3 is received by the vehicle 1 and exemplarily by the other vehicles 4, 5 as well. The first message 111, as described above, is based on the first sensor value 101 obtained by the sensor of the RSU 3. The first message 111 is received directly or indirectly. In particular, the first message 111 is received via direct communication according to the ITS-G5 and/or the C-V2X standard and/or via indirect communication via a backend. The first message 111 is, for example, a collective perception message, CPM, according to the ETSI TR 103 562 or ETSI TS 103 324 standard.

In the second step S102, the vehicle 1 and the other vehicles 4, 5 are detecting second sensor values 102. The second sensor values 102 correspond to the first sensor value 101 of the first message 111.

In the third step S103 the second message 112 is transmitted to the server 1 by the vehicles 1, 4, 5. The second message 112 is based on the first sensor value 101 of the first message 111 and the second sensor value 102 detected in the second step S102. The second message 112 is also transmitted to the RSU 3. In particular, the second message 112 is transmitted via a different form of communication than the first message 111.

In the fourth step S201, second messages 112 from the vehicles 1, 4, 5 are received by the server 2.

In the fifth step S202, the server 2 is determining deviations 104 based on the second messages 112. In particular, the server 2 is determining first sensor values 101 and second sensor values 102 based on the second messages 112 and determining the deviations 104 based on the first sensor values 101 and the second sensor values 102.

In a sixth step S203, the server 2 is aggregating the deviations 104 as deviation data 105 in the database 61. The RSU 3 associated with the respective deviation 104 is identified by an ID 103 in the deviation data 105. The server 2 is further determining a mean deviation 106 and a score 107 associated with the RSU 3 based on the deviation data 105 in the sixth step S203. The score 107 relates to an estimation of the reliability of the RSU 3. The mean deviation 106 is exemplarily determined as a mean value of the deviations 104.

In the seventh step S204, the server 2 is transmitting a third message 113 to the vehicles 1, 4, 5 and the RSU 3. The message 113 is based on the deviation data 105. In particular, the message 113 comprises the ID 103 of the RSU 3, the mean deviation 106 and the score 107 associated with the RSU 3. The RSU 3 may then perform a recalibration, offset correction or the like based on the mean deviation 106 and the score 107.

In the eighth step S104, the vehicles 1, 4, 5 are receiving the third message 113 from the server 2.

In the ninth step S105, the vehicles 1, 4, 5 are performing a correction of sensor values received from the RSU 3 based on the mean deviation 106 and the score 107 received with the third message 113 in the eighth step S104.

LIST OF REFERENCE NUMERALS

1 Vehicle
2 Server
3 Road Side Unit, RSU
4 Second Vehicle
5 Third Vehicle
11 First Sensor
12 Second Sensor
13 Third Sensor
101 First sensor value
102 Second sensor value
103 ID
104 Deviation
105 Deviation data
106 Mean deviation
107 Score
111 First Message
112 Second Message
113 Third Message
30 Communication interface
31 Memory
32 Transceiver
40 Controller
41 Memory
42 CPU 50 Communication interface
51 Memory
52 Transceiver
60 Control circuit
61 Database
62 CPU
S101 First Step
S102 Second Step
S103 Third Step
S201 Forth Step
S202 Fifth Step
S203 Sixth Step
S204 Seventh Step
S104 Eighth Step
S105 Ninth Step The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A vehicle system comprising a vehicle and a server, the vehicle comprising:
at least one vehicle sensor configured for detecting vehicle sensor values;
a communication interface configured for wireless communication with a stationary road side unit (RSU) and the server, and
a controller, configured for:
receiving a first message from the stationary road side unit via the communication interface, the first message being based on a first sensor value obtained by a stationary sensor of the stationary road side unit, the first message comprising position information of the vehicle;
detecting a second vehicle sensor value via the at least one vehicle sensor, the second sensor value being correlated to the first sensor value and comprises position information of the vehicle;
determining a position deviation based on the first sensor value and the second sensor value;
transmitting a second message to the server via the communication interface, the second message being based on the first sensor value and the second sensor value and comprising the determined position deviation; wherein
the server is configured to calculate a mean position deviation from the second message and deviation data, stored in a database; and to selectively initiate recalibration of the stationary road side unit based upon comparing the mean position deviation with a predefined threshold.

2. The vehicle system of claim 1, wherein the first message comprises a first derivative value based on the first sensor value and the controller is further configured to:

determine a second derivative value based on the second sensor value; and determine the deviation as the difference between the first derivative value and the second derivative value.

3. The vehicle system of claim 2, wherein the first message comprises sensor-based information related to a plurality of vehicles and the controller is further configured to:

retrieve information related to the vehicle from the first message; and determine the position deviation based on the information related to the vehicle and the second sensor value.

4. The vehicle system of claim 2, wherein the controller is further configured to:

determine an ID of the RSU based on the first message; and transmitting the second message to the server, the second message comprising the position deviation and the ID of the RSU.

5. The vehicle system of claim 1, wherein the first message comprises sensor-based information related to a plurality of vehicles and the controller is further configured to:

retrieve information related to the vehicle from the first message; and determine the deviation based on the information related to the vehicle and the second sensor value.

6. The vehicle system of claim 5, wherein the controller is further configured to:

determine an ID of the RSU based on the first message; and transmitting the second message to the server, the second message comprising the position deviation and the ID of the RSU.

7. The vehicle system of claim 1, wherein the controller is further configured to:

determine an ID of the RSU based on the first message; and transmitting the second message to the server, the second message comprising the position deviation and the ID of the RSU.

8. The vehicle system of claim 7, wherein the controller is further configured to:

receive a third message from the server via the communication interface, wherein the third message comprises the ID of the RSU and the mean position deviation and/or score associated with the RSU.

9. The vehicle system of claim 8, wherein the score relates to an estimation of the reliability of the RSU.

10. The vehicle system of claim 9, wherein the controller is further configured to perform a correction of further sensor values and/or derivative values received from the RSU based on the mean position deviation.

11. The vehicle system of claim 9, wherein the controller is further configured to evaluate further first messages only if the score exceeds a predefined threshold.

12. The vehicle system of claim 8, wherein the controller is further configured to perform a correction of further sensor values and/or derivative values received from the RSU based on the mean position deviation.

13. The vehicle system of claim 8, wherein the controller is further configured to evaluate further first messages only if the score exceeds a predefined threshold.

14. A server, comprising:

a communication interface configured for wireless communication with a stationary road side unit (RSU) and a plurality of vehicles;

a database configured for storing a variety of data, and a control circuit configured for:

receiving messages from the plurality of vehicles via the communication interface, each of the messages being based on a first sensor value detected by a stationary sensor of the stationary RSU and a correlated second sensor value detected by a sensor of a respective one of the plurality of vehicles, wherein the first sensor value and the second sensor value comprise position information of the respective one vehicle of the plurality of vehicles;

storing position deviation data in the database based on the received messages;

calculating a mean position deviation based on the position deviation data, stored in the database; and selectively initiating recalibration of the stationary road side unit based upon comparing the mean position deviation with a predefined threshold.

15. The server of claim 14, wherein the control circuit is further configured to:

transmit a message to at least one of the plurality of vehicles and/or the RSU via the communication interface, wherein the message is based on the position deviation data.

16. The server of claim 14, wherein the control circuit is further configured to trigger a maintenance of the RSU based on the mean position deviation.

* * * * *